United States Patent [19]

Arlemark

[11] 4,174,809
[45] Nov. 20, 1979

[54] IRRIGATION MACHINE

[76] Inventor: Jan M. Arlemark, Skansgatan 18, 272 00 Simrishamn, Sweden

[21] Appl. No.: 844,306

[22] Filed: Oct. 21, 1977

[30] Foreign Application Priority Data

Oct. 22, 1976 [SE] Sweden .............................. 7611743
Nov. 16, 1976 [SE] Sweden .............................. 7612780
Apr. 26, 1977 [SE] Sweden .............................. 7704768

[51] Int. Cl.² .............................................. B05B 3/18
[52] U.S. Cl. ............................... 239/189; 137/355.2; 239/191; 239/197; 242/86.2; 242/86.5 R
[58] Field of Search ............... 239/189, 191, 196–199; 137/355.12, 355.16, 355.18, 355.19, 355.2, 355.21; 242/75.53, 86.2, 86.5 R

[56] References Cited

U.S. PATENT DOCUMENTS

| 1,761,191 | 6/1930 | Browning | 137/355.19 X |
| 2,518,990 | 8/1950 | Keener | 239/191 X |
| 3,628,731 | 12/1971 | Phillips | 239/191 X |
| 3,684,178 | 8/1972 | Friedlander | 239/191 X |
| 3,939,862 | 2/1976 | Booth | 137/355.16 |
| 3,972,478 | 8/1976 | Groelz | 137/355.16 X |
| 4,003,519 | 1/1977 | Kruse et al. | 239/191 X |

FOREIGN PATENT DOCUMENTS 2269856 12/1975 France .................................... 239/198

Primary Examiner—Johnny D. Cherry
Attorney, Agent, or Firm—B. P. Fishburne, Jr.

[57] ABSTRACT

The disclosure relates to irrigation machines of the type provided with a hose reel rotatably mounted on a wheeled frame. One end of the hose, fixed to the hose reel, is connectable to a water supply source and the other to a sprinkler gun. The hose reel is coupled to a drive motor designed as a water turbine. The water turbine is coupled into the conduit system of the machine via a flow-divider which is in the form of a three-way valve with one inlet and two outlets, the water turbine being coupled in between the two outlets.

6 Claims, 10 Drawing Figures

IRRIGATION MACHINE

The present invention relates to an irrigation machine with a hose reel, rotatably mounted on a wheeled frame, for a withdrawable and rewindable hose, whose one end, fixed to the hose reel, is connectable via a coupling to a water supply source and whose other end is connected to a sprinkler gun on a gun carriage or sled, the reel for the hose, which is compression resistant and consists of rigid hose material, being coupled to a driving motor designed as a water turbine, the motor being coupled into a conduit system from the water supply source to the sprinkler gun, and the hose reel being mounted with its axis of rotation substantially horizontal.

Such a machine for watering int. al. lawns and other small areas is known from U.S. Pat. No. 2,518,990 according to which the reel is driven by means of an impeller through which flows all of the water fed to the sprinkler. However, when this type of irrigation device has been manufactured in the form of a variation for the irrigation of large or medium-large areas within agriculture, difficulties have been encountered partly because the forces necessary for winding up the hose have become greater, partly because of difficulties in keeping constant the rewinding speed of the hose, and partly as a result of difficulties in setting the irrigation quantity in such a flexible manner that one and the same irrigation machine can be used for irrigating such different crops as tomatoes, lettuce and potatoes which require completely different amounts of water and present substantially different resistance to the droplet size of the water emanating from the sprinkler.

A major aspect of the present invention is, therefore, to realize a large-scale irrigation machine with the requisite flexibility as regards the winding-up speed of the hose, the irrigation intensity, etc. To this end, the irrigation machine of the type disclosed by way of introduction is characterized, according to the invention, in that the water turbine is coupled into the conduit system via an adjustable flow divider in the form of a three-way valve with one inlet and two outlets, the water turbine being connected in between the two outlets.

According to a further development of this invention, the flow divider has a main channel leading from the water supply source to the hose, in which channel is disposed a throttle point, the water turbine being coupled into a branch conduit whose ends are connected to the main channel on either side of the throttle point, and a regulator valve being disposed in a by-pass conduit whose ends are connected to the main channel on either side of the throttle point. This further development of the invention is particularly advantageous in cases where it is difficult to keep constant the winding-up speed of the hose because the still unwound section of the hose becomes shorter during the winding-up process. The progressively reducing length of the hose lying on the ground entails a progressive reduction in the friction resistance between the hose and the ground. Moreover, the weight of the hose and the water carried therein becomes less, and the winding diameter of the reel increases. By designing the irrigation machine in the last-mentioned manner, these difficulties are counteracted.

A further refinement in the regulation of the winding-up process is obtained if the regulator valve in the last-mentioned embodiment of the invention is provided with an opening and closing device which is operative, during the winding-up of the hose, to be actuated for progressive opening of the regulator valve. This progressive opening of the regulator valve can be achieved by means of a toothed wheel which forms part of the opening and closing device and is actuable by means of bosses disposed on the winding reel. Another preferred possibility is that the opening and closing device be driven by means of belt or chain operation which is connected to the central shaft of the reel.

Apart from this compensation partly for the progressively reducing friction resistance between the hose and the ground as a result of the fact that the still unwound section of the hose becomes progressively shorter, partly for the progressive reduction of the weight of this hose section and partly for the progressively increasing winding diameter on the reel, variations in the winding-up speed of the hose can under certain conditions still occur in a negative manner, for example as a result of a sudden shower of rain which makes the earth along the entire length of the hose slippery with consequent reduction of the friction between the ground and the hose, or as a result of the fact that the ground is rapidly dried out because of drought and midday heat with a consequent increase in the friction between the ground and the hose. In order to counteract this latter negative variation in the winding-up speed of the hose, a further development of the invention suggests that the shaft of the water turbine be coupled to a rotation speed regulator whose regulator arm is connected to the adjustable throttle point such that the through-flow area of the throttle point is increased on increased speed of rotation of the water turbine and vice versa. In this way, an irrigation machine will thus be obtained which draws in the hose at substantially constant speed even in the event of, for example, variations in the friction between the hose and the ground.

The nature of the present invention and its aspects will be more fully understood from the following description of the drawings, and discussion relating thereto.

Figure 1:
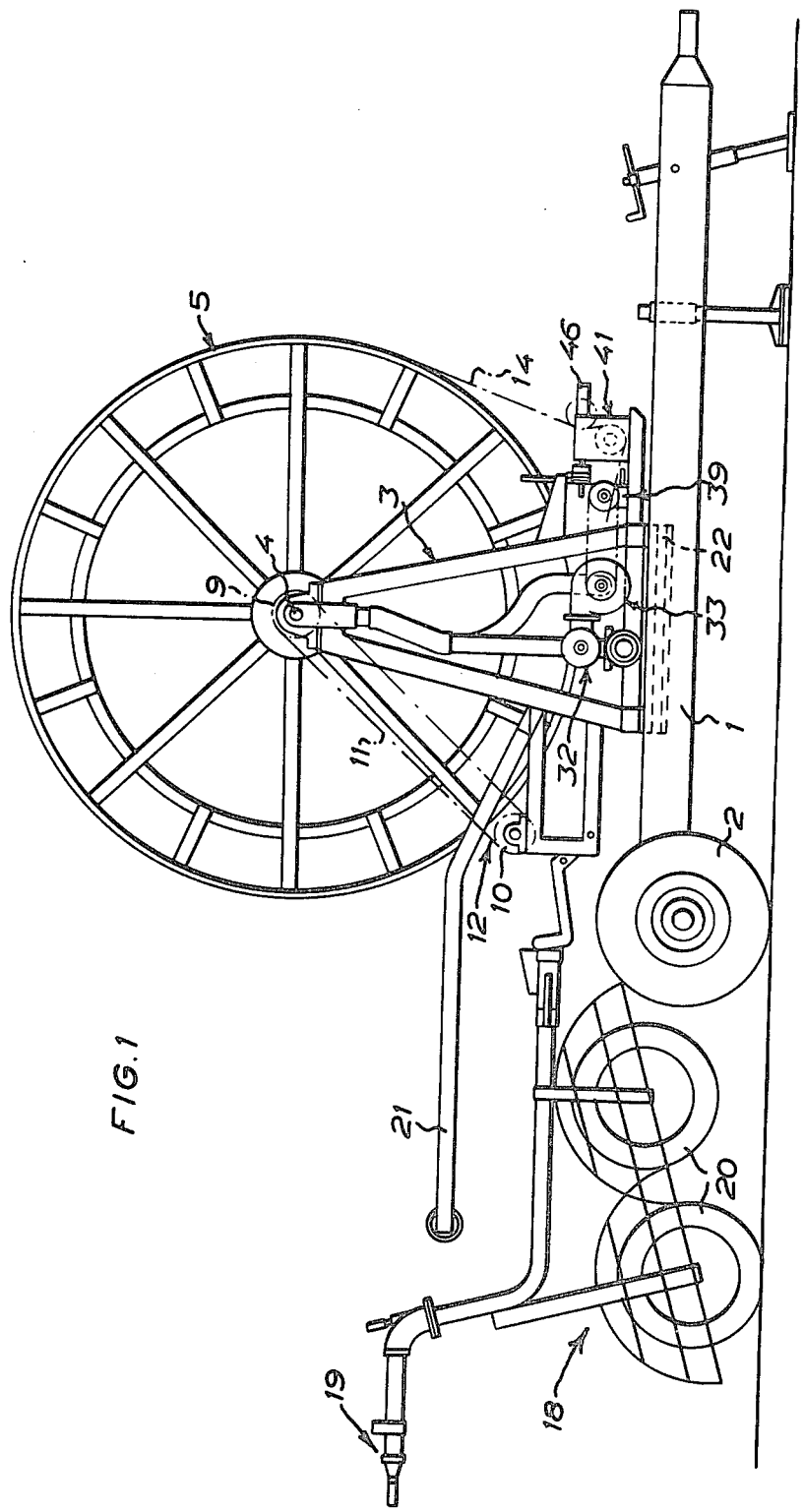
FIG. 1 is a side elevation of a machine according to the invention.
Figure 2:
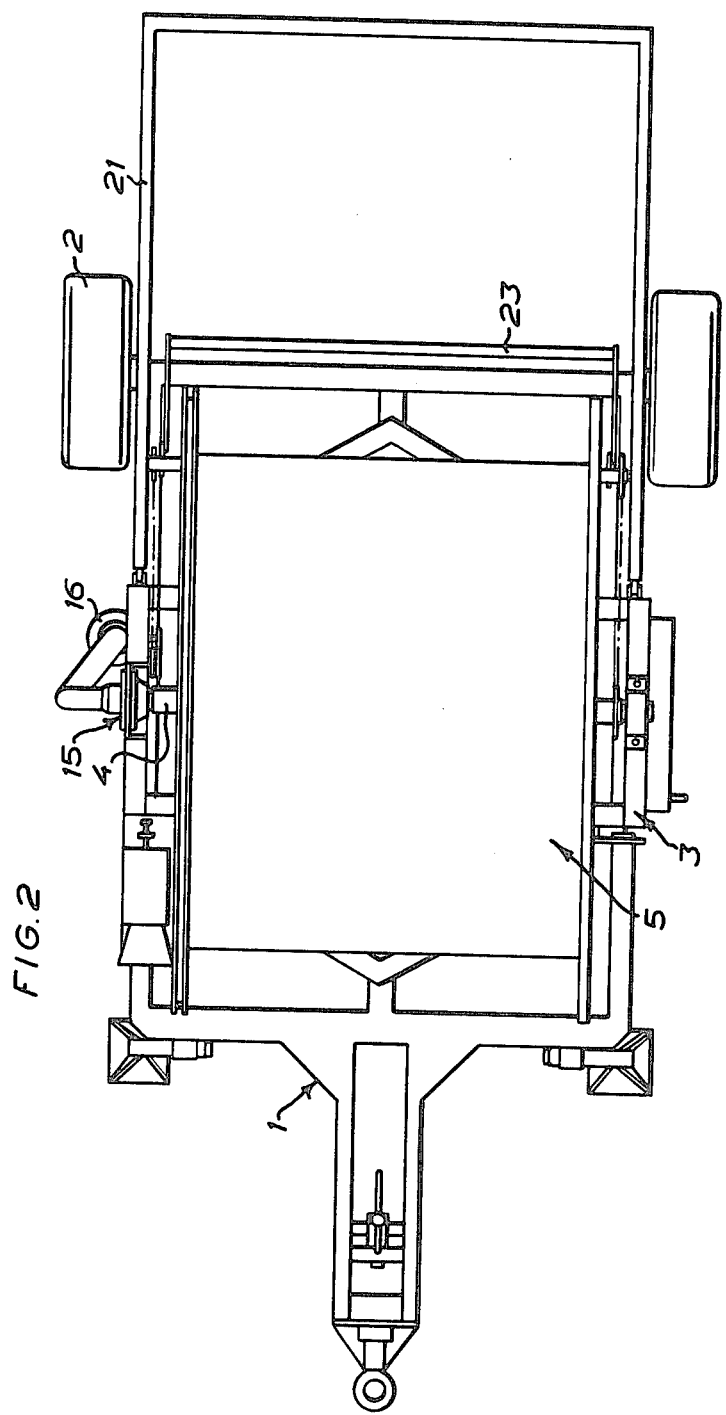
FIG. 2 is a top plan view of another example of an irrigation machine according to the present invention, the gun carriage and hose of the machine having been removed.
Figure 8:
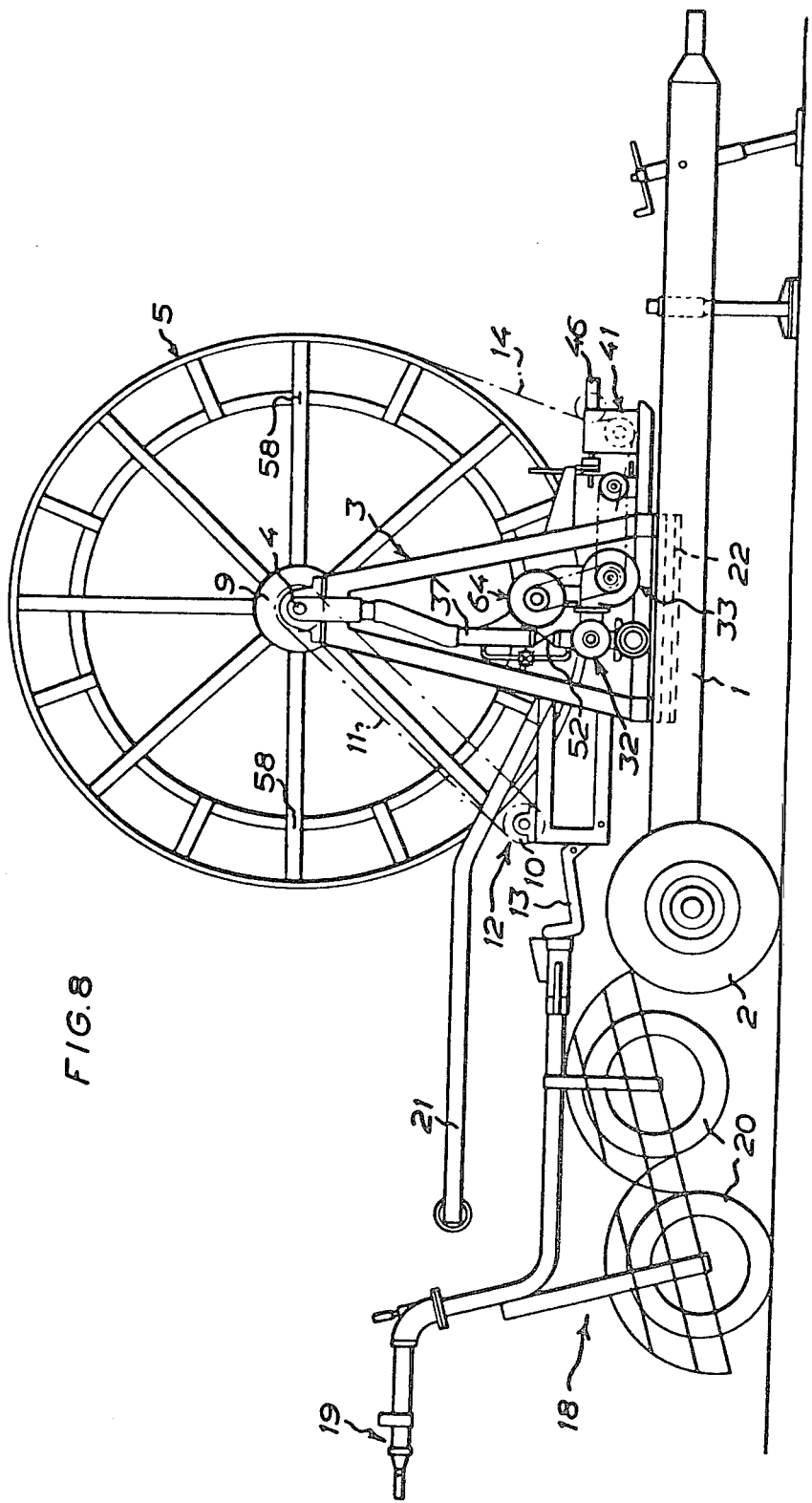
Figure 9:
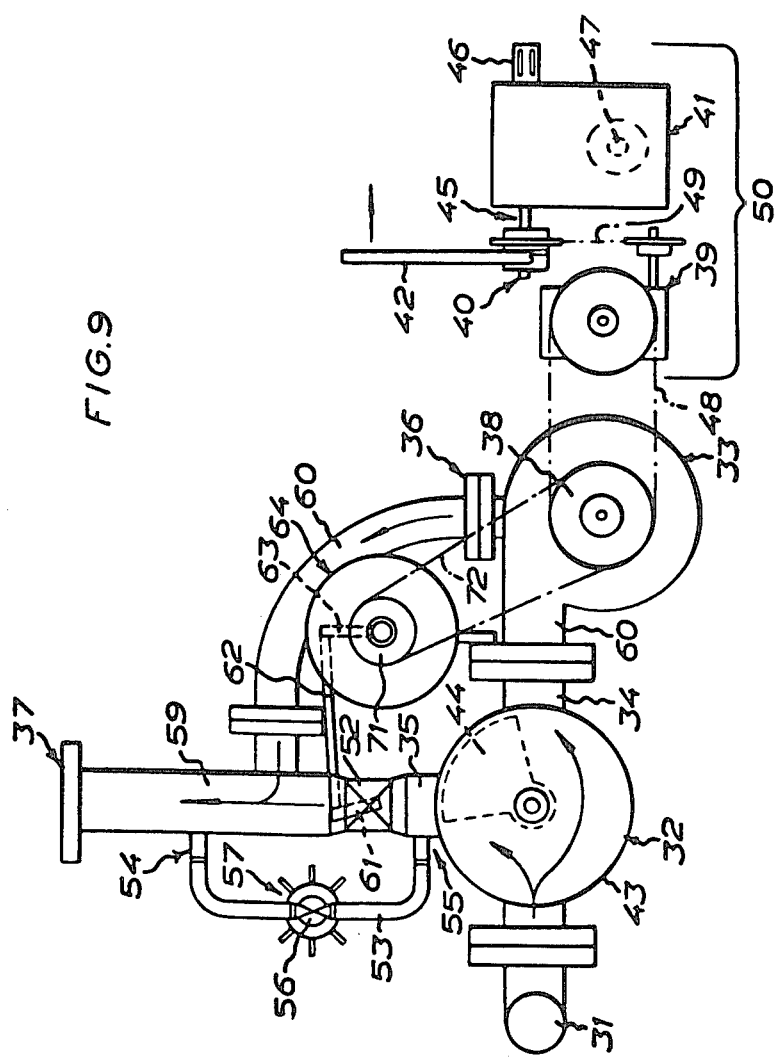
Figure 10:
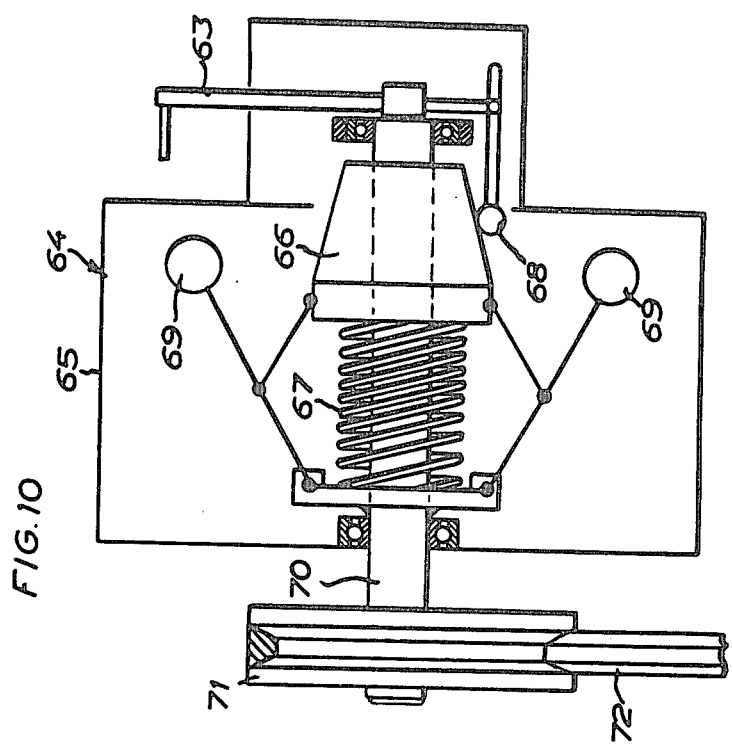

FIGS. 8 and 9 show a further development of the irrigation machine in a manner which corresponds to FIGS. 1 and 2; and FIG. 10 is a schematic diagram of a rotation speed regulator included in the irrigation machine according to FIGS. 8 and 9.

The irrigation machine according to the invention shown on FIG. 1 has a frame 1 which is designed as a waggon provided with wheels 2. A support 3 is mounted on the frame and is provided at the top with a shaft 4 for a rotatably mounted hose reel 5. This hose reel 5 has on its one end wall either a series of driving teeth 6 (FIG. 4) or a chain or belt groove (FIG. 1). The hose reel is connected by means of sprocket wheels 9 and 10 and a chain 11 to a hose laying mechanism 12 with a runner 7 which is driven to and fro by an endless screw 8 for laying a hose 13 which may be wound onto the reel in adjacent coils in each layer of hose wound onto the hose reel. Moreover, the hose reel 5 is connected to a chain or belt drive 14 (FIG. 1) which in turn is connected to a rapid winding mechanism 41, which obtains power from, for example, a shaft from a tractor, and to a driving motor which will be described in greater detail below. The inner end of the hose 13 wound onto the hose reel is connected via a coupling pipe 15 to water inlets 16 to which may be connected a supply source for water under pressure. The other end of the hose 13 is connected by means of a coupling 17 to a sprinkler gun 19 disposed on a gun carriage 18. The gun carriage 18 has, in the illustrated embodiment, three wheels 20, the distance of the outer wheels from the centremost wheel being adjustable for adaption of the gun to crops sown in rows.

Figure 5:
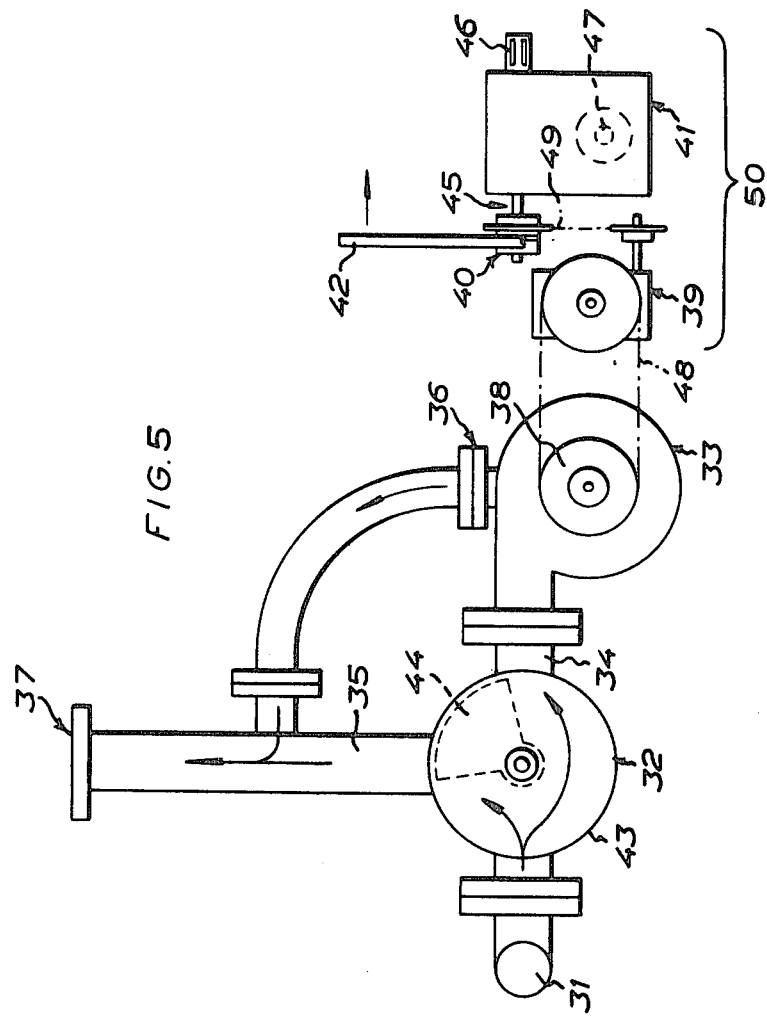
FIG. 5 is a schematic illustration of a drive for the irrigation machines in FIG. 1 and FIGS. 2–4 respectively.

It is apparent from FIG. 5 that the driving motor which turns the hose reel for winding up the hose 13 during the irrigation process proper is a water turbine 33 which, via an adjustable flow divider 32, is coupled into a conduit system from the connections 16 of the water supply source to the sprinkler gun. The flow divider 32 is a three-way valve which has one inlet 31 and two outlets 34 and 35, the water turbine being connected in between the two outlets 34 and 35. As is apparent from flow direction arrows which show the flow of water through the system, the outlet 36 of the water turbine and the outlet 35 of the flow divider 32 are coupled together to a common outlet 37 to the gun 19. The three-way valve 32 is a throttle valve with a sector-shaped valve body 44 rotatably disposed in a valve housing 43.

Figure 3:
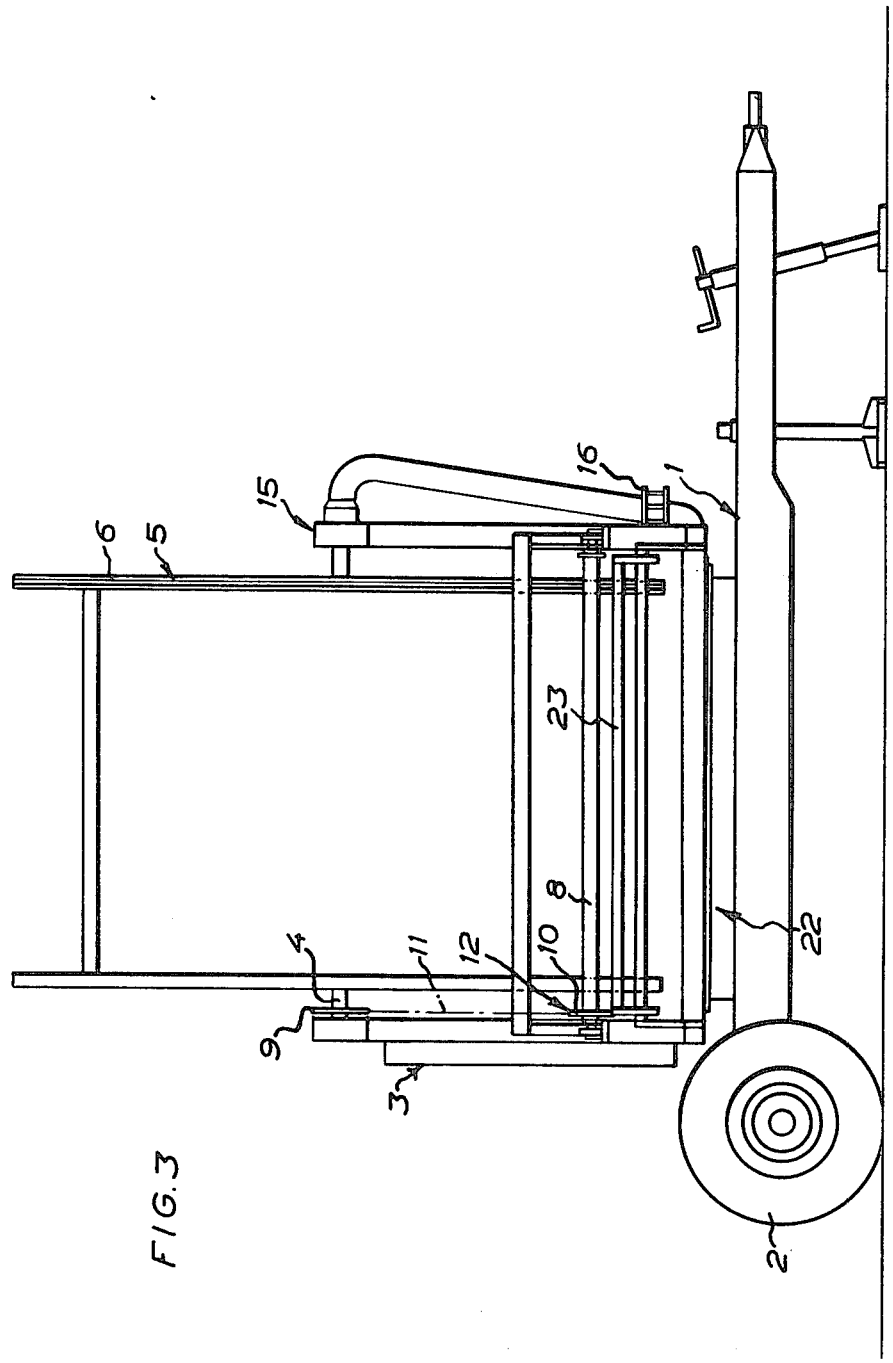
FIG. 3 is a side elevation of the irrigation machine of FIG. 2.
Figure 4:
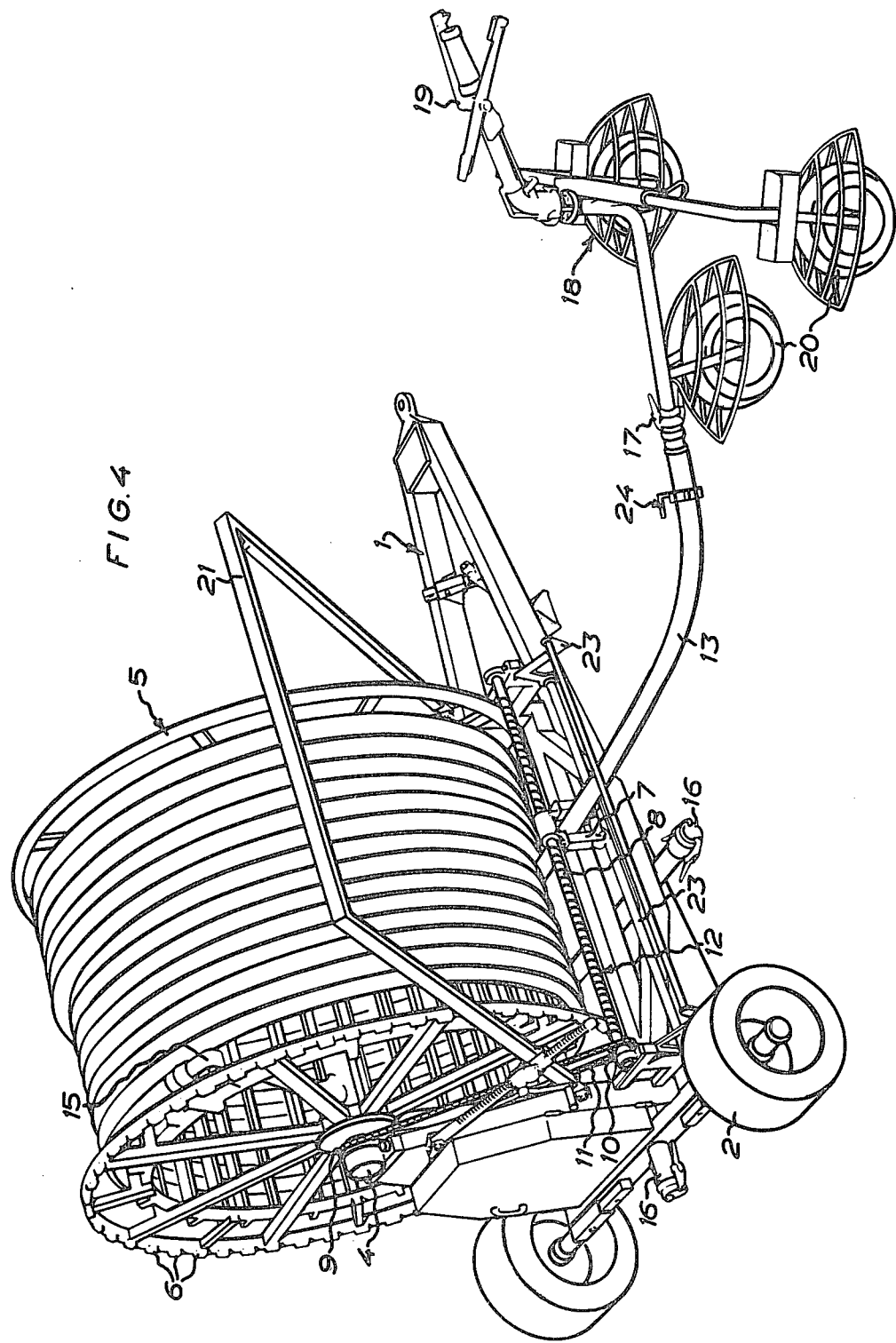
FIG. 4 is a perspective view of the irrigation machine of FIGS. 2 and 3 and illustrates its use.

The water turbine 33 is connected via a reduction gear assembly 50 to a member which directly drives the hose reel 5 and, in FIG. 1, consists of a chain or belt drive 14 and in FIGS. 2-4 consists of a pinion which engages with the driving teeth 6. The reduction gear assembly 50 consists, in the embodiment illustrated in FIG. 5, of a final gear 41 and an intermediate gear 39 connected therewith by the intermediary of a disengagement device 40. The final gear 41 has two driving inputs 45 and 46, one for power from the turbine 33 and one for power from the power shaft on a tractor (not shown). The disengagement device 40 has an operating handle 42 for disengaging the water turbine 33 on driving by means of the tractor.

The chain and belt drive 14 in FIG. 1 runs over an outer ring on one end wall of the hose reel 5 and over a chain or belt pulley (not shown) disposed at the driving output shaft 47 of the reduction gear assembly 50.

The disengagement device 40 is coupled to the driving input 45 of the final gear 41.

Moreover, a lifting arm 21 is provided on the frame or waggon 1 for lifting the gun carriage 18 when the irrigation machine is transported from one place to another.

It is apparent from FIGS. 1 to 4 that the support 3 is rotatably mounted on the waggon 1 proper in that it is carried on a turntable-like device 22. The support 3 and the hose reel 5 can, thus, be rotated about a vertical axis in order that it be possible to draw out the hose in any given direction from the irrigation machine. Hence, the support 3 and the hose reel 5 can be rotated through 360° in order that the hose may be withdrawn at any given direction without moving the irrigation machine.

The hose utilized in the irrigation machine according to the invention should be compression-resistant and consist, therefore, of a rigid plastic material, preferably polyethylene. As a result, very great hose lengths can be utilized, for example up to 400 m in length on the hose reel, for such a polyethylene hose can withstand the powerful tensile loading which occurs when such a long hose is wound up on the hose reel.

Since the water turbine 33 is coupled into a branch conduit in the conduit system from the water supply source to the sprinkler gun 19, the speed of rotation of the reel in the embodiments according to FIGS. 1–5 can be determined by regulation of the amount of water which is allowed to pass through the water turbine, and the winding-up speed can, thus, be gradually regulated within the interval of, for example, 0–40 m/h by turning the valve body 44 in the valve housing 43. On this turning of the valve body 44 the relative flow amounts to the outlets 34 and 35 from the valve housing are changed.

Because the reduction gear assembly 50 has two driving inputs, one for the driving motor 33 and one for connection to the power shaft of a tractor for rapid winding-up, the hose can be rapidly wound up on the reel, for example, when irrigation is to be discontinued or when the hose is to be emptied for winter storage.

The irrigation machine has a shut-off device 23 in the form of a pivotally journalled yoke which is connected via a link system to a shut-off valve (not shown). This yoke is intended to cooperate with the carriage 18, its hose coupling 17 or a catch 24 fixedly mounted on the hose and pivoting the yoke 23 when the gun carriage has been drawn in adjacent the frame 1 of the irrigation machine. In this manner, the water supply is cut off when the gun carriage reaches the frame of the irrigation machine and the hose reel.

Figure 6:
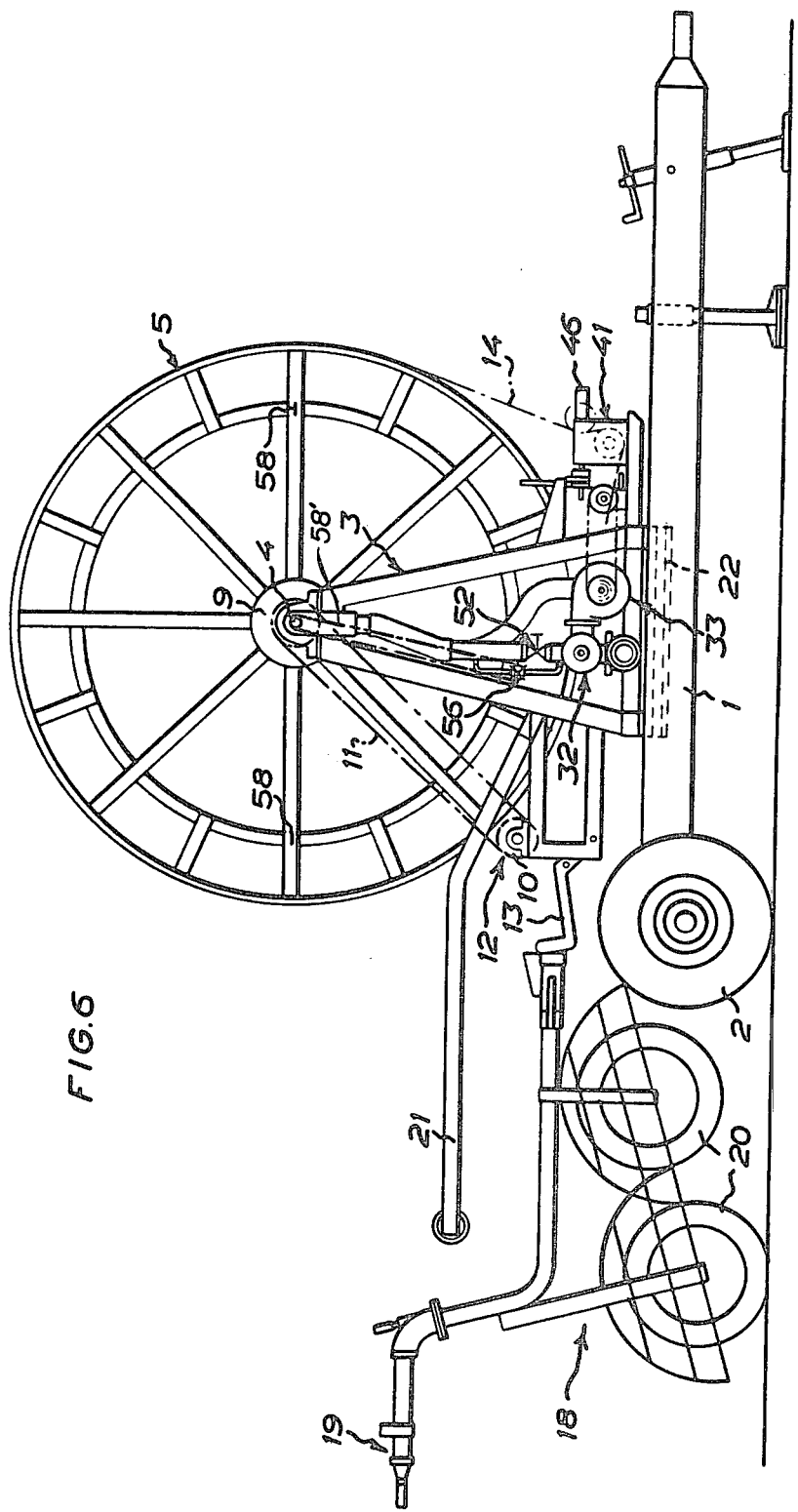
FIGS. 6 and 7 show a development of the irrigation machine in a manner which corresponds to FIG. 1 and 5 respectively.
Figure 7:
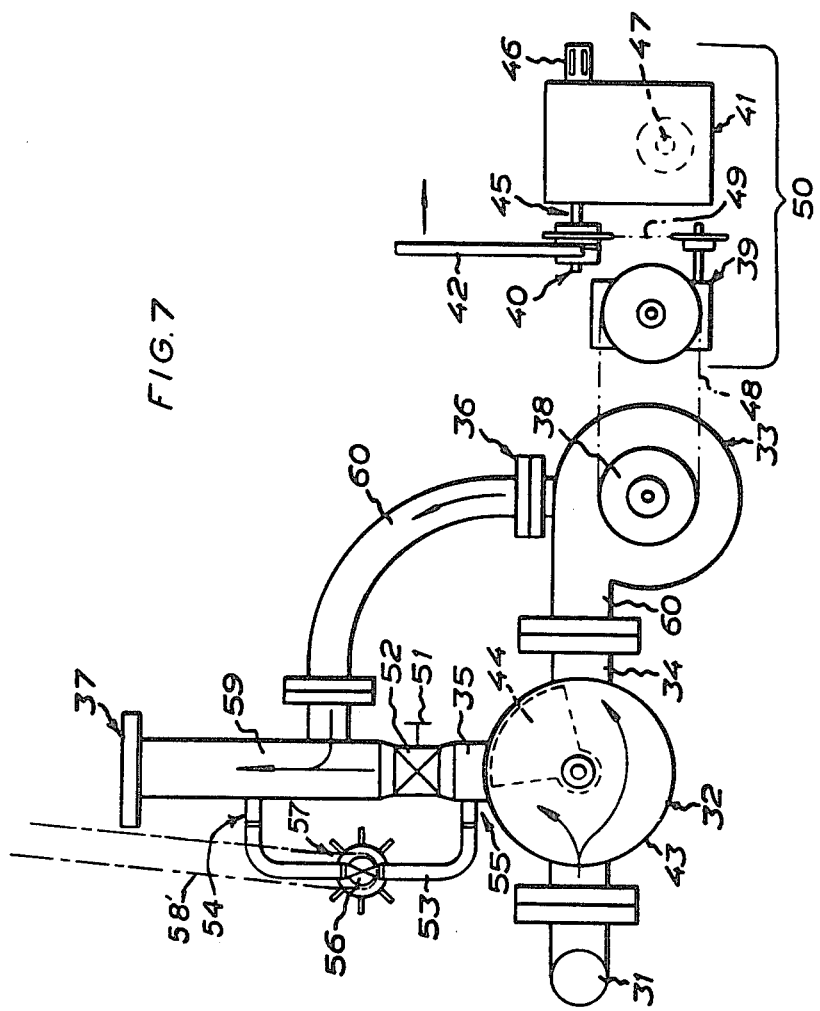

In the embodiment according to FIGS. 6 and 7, parts which are identical to parts in FIGS. 1 to 5 have been given the same reference numeral.

As is apparent from FIG. 7, the difference resides in the fact that a throttle in the form of a sluice valve 52 adjustable by means of a handle 51 is disposed in a main conduit 59 to the hose above the outlet 35. That branch conduit 60 into which the water turbine 33 is coupled is connected with its ends on either side of the sluice valve 52. Moreover, a by-pass conduit 53, whose ends 54 and 55 are connected to the main conduit 59 on either side of the sluice valve 52, is provided with a regulator valve 56 in the form of a sluice valve. The regulator valve 56 may be opened and closed by means of a toothed wheel 57 which is actuable by means of bosses 58 disposed on the reel 5. The regulator valve 56 can be opened and closed by belt or chain drive, 58', FIGS. 6 and 7 instead of by a toothed wheel, the drive being connected to the centre shaft 4 of the reel 5. In order to compensate for the factors discussed by way of introduction (that is to say the reduced friction resistance, the reduced weight of the hose and the increasing winding diameter on the reel during the winding-up process which together entail that the drawing-in speed of the hose increases) the torque of the water turbine 33 must be reduced, that is to say the pressure drop over the turbine must be reduced. When the hose has been drawn out to its full length, the valve 52 is adjusted by means of the handle 52 to the desired winding-up speed. The valve 56 is then closed or almost closed. Since the reel rotates during the winding-up, the bosses 58 strike the teeth of the toothed wheel 57, with the result that the valve 56 is progressively opened. The pressure drop across the throttle (that is to say the valve 52) is thereby reduced and the traction force exercised by the water turbine on the hose 13 lessens. When the gun carriage 18 has been drawn in to the reel 5, the control valve 56 is almost completely open. By appropriate selection of the number of bosses 58 on the reel, it is possible to ensure that the hose be drawn in at substantially constant speed.

In the embodiment according to FIGS. 8 to 10, parts which are identical to parts in FIGS. 1 to 7 have been given the same reference numeral.

As is apparent from, in particular, FIG. 9, the novel feature here in relation to FIGS. 6 and 7 resides in the fact that the adjustable throttle point 52 has been designed as a valve whose through-flow opening can be varied by turning a lever 61 which is connected by means of a link 62 to a regulating arm 63 in a centrifugal regulator 64. This centrifugal regulator is schematically illustrated in FIG. 10 and may be of conventional construction with a cone 66 rotatably journalled in a housing 65 and being under the influence of a compression spring 67 and whose axial position relative to a sensor 68 is variable under the action of weights 69 rotating together with the cone. A grooved pulley 71 is mounted on the shaft 70 of the centrifugal regulator. This grooved pulley is connected, by means of a V-belt 72, to a pulley 38 mounted on the shaft of the water turbine 33, the pulley in this case being designed as a double pulley whose second belt groove is utilized for the driving belt 48.

When the irrigation machine according to FIGS. 8 to 10 is used, the hose is first drawn out to its full length and the valve 32 (or an extra valve, not shown, between the three-way valve 32 and the valve 52) is set in such a position that the desired winding-up speed is obtained. The valve 56 is then closed or as good as closed. During the winding-up of the hose, this valve is then progressively opened in the manner which was disclosed in conjunction with FIGS. 6 and 7.

If the friction between the ground and the still laid-out section of the hose were to be exposed to a considerable change, for example a reduction as a result of a shower of rain during the normally long period when the irrigation machine is in operation, for example from 7 to 8 hours, the speed of the turbine 33 will increase, which entails an increase in the speed of rotation of the centrifugal regulator 64 and thereby a regulation movement of the arm 63, the link 62 and the arm 61 for increasing the through-flow area of the valve 52. As a result, the pressure drop across the turbine 33 will be reduced such that the flow therethrough also lessens. The result will be that the effect of the friction reduction caused by the shower of rain (which would normally have entailed an increase in the winding-up speed) will be counteracted so that the hose will be drawn in at substantially constant speed even in the event of a change, caused by the weather, of the friction between the ground and the still laid-out section of the hose.

I claim:

1. An irrigation machine with a hose reel rotatably mounted on a wheeled frame for a withdrawable and rewindable hose whose one end fixed to the hose reel is connectable via a coupling to a water supply source, and whose other end is connected to a sprinkler gun on a gun carriage or a sled, the hose reel for the hose, which is compression resistant and consists of rigid hose material, being coupled to a drive motor designed as a water turbine, which drive motor is coupled into a conduit system from the water supply source to the gun, and the hose reel being journalled with its axis of rotation substantially horizontal, wherein said water turbine is coupled into said conduit system via a flow-divider in the form of a three-way valve with one inlet and two outlets, said water turbine being coupled in between the two outlets, said flow-divider having a main channel leading from the water supply source to the hose, in which channel there is provided a throttle point, wherein the water turbine is coupled into a branch conduit whose ends are connected to the main channel on either side of the throttle point, said throttle point being adjustable, and a regulator valve disposed in a by-pass conduit whose ends are connected to the main channel on either side of the throttle point.

2. An irrigation machine as recited in claim 1, wherein the regulator valve has an opening and closing device which is disposed, during winding-up of the hose, to be actuated for progressive opening of the regulator valve.

3. An irrigation machine is recited in claim 2, wherein the opening and closing device is provided with a toothed wheel which is actuable by means of bosses disposed on the reel.

4. An irrigation machine as recited in claim 2, wherein the opening and closing device is provided with belt or chain drive which is connected to the center shaft of the reel.

5. An irrigation machine as recited in claim 1, wherein a shaft of the water turbine is coupled to a rotation speed regulator whose regulator arm is connected to the adjustable throttle point such that the through-flow area thereof is increased on an increase of the speed of rotation of the water turbine, and vice versa.

6. An irrigation machine as recited in claim 5, wherein the adjustable throttle point consists of a throttle valve.

* * * * *